United States Patent
Kuster et al.

(10) Patent No.: US 10,344,525 B2
(45) Date of Patent: Jul. 9, 2019

(54) INSULATED GLAZING WITH SPACER, RELATED METHODS AND USES

(71) Applicant: SAINT-GOBAIN GLASS FRANCE, Courbevoie (FR)

(72) Inventors: Hans-Werner Kuster, Aachen (DE); Rolf Koette, Alsdorf (DE); Walter Schreiber, Aachen (DE)

(73) Assignee: SAINT-GOBAIN GLASS FRANCE, Courbevoie (FR)

(*) Notice: Subject to any disclaimer, the term of this patent is extended or adjusted under 35 U.S.C. 154(b) by 0 days.

(21) Appl. No.: 15/321,161

(22) PCT Filed: Jun. 19, 2015

(86) PCT No.: PCT/EP2015/063814
§ 371 (c)(1),
(2) Date: Dec. 21, 2016

(87) PCT Pub. No.: WO2015/197488
PCT Pub. Date: Dec. 30, 2015

(65) Prior Publication Data
US 2017/0145734 A1    May 25, 2017

(30) Foreign Application Priority Data

Jun. 27, 2014  (EP) .................................. 14174745

(51) Int. Cl.
*E06B 3/663*    (2006.01)
*E06B 3/673*    (2006.01)

(52) U.S. Cl.
CPC ...... *E06B 3/66328* (2013.01); *E06B 3/66366* (2013.01); *E06B 3/6733* (2013.01);
(Continued)

(58) Field of Classification Search
CPC ..... Y02B 80/22; Y02B 80/24; E06B 3/66328; E06B 3/6733
See application file for complete search history.

(56) References Cited

U.S. PATENT DOCUMENTS 2,094,381 A     9/1937  Slayter
2,303,897 A *  12/1942  Smith ................ E06B 3/66361
                                                   52/172
(Continued)

FOREIGN PATENT DOCUMENTS

CA      2275448 A1      7/1998
CA      2 855 278 A1    7/2013
(Continued)

OTHER PUBLICATIONS

International Search Report for International Application No. PCT/EP2015/063814 filed on Jun. 19, 2015 in the name of Saint-Gobain Glass France. (English translation and German original) dated Aug. 14, 2015.

(Continued)

*Primary Examiner* — Donald J Loney
(74) *Attorney, Agent, or Firm* — Pillsbury Winthrop Shaw Pittman LLP

(57) ABSTRACT

An insulating glazing unit having a first pane, a second pane, an outer pane interspace, an inner pane interspace, and a spacer is described. The spacer has a glazing interior surface, a first pane contact surface, and a second pane contact surface, a plastic profile, a primary sealing means, and a main member. The main member contains a sealing material containing a drying material. The plastic profile separates the outer pane interspace from the inner pane interspace. The main member is arranged in the outer pane interspace (Continued)

Figure 1A:
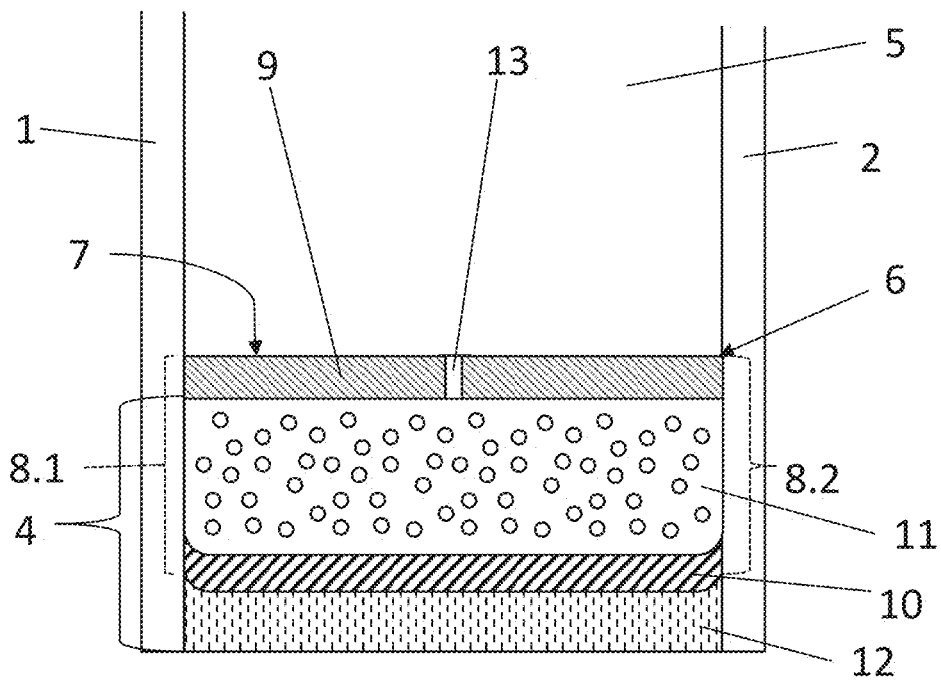

adjacent the plastic profile and the primary sealing means is arranged in the outer pane interspace adjacent the main member.

21 Claims, 4 Drawing Sheets

(52) U.S. Cl.
CPC ........... *E06B 3/66361* (2013.01); *Y02B 80/22* (2013.01); *Y02B 80/24* (2013.01)

(56) References Cited

U.S. PATENT DOCUMENTS

| | | | |
|---|---|---|---|
| 2,834,999 A * | 5/1958 | Taylor | E06B 3/66328 52/172 |
| 3,168,089 A | 2/1965 | Larkin | |
| 3,793,276 A | 2/1974 | Blunt et al. | |
| 3,935,683 A | 2/1976 | Derner et al. | |
| 3,998,680 A | 12/1976 | Flint | |
| 4,080,482 A | 2/1978 | Lacombe | |
| 4,109,431 A | 8/1978 | Mazzoni et al. | |
| 4,198,254 A | 4/1980 | Laroche et al. | |
| 4,226,063 A | 10/1980 | Chenel | |
| 4,479,988 A | 10/1984 | Dawson | |
| 4,613,530 A | 9/1986 | Hood et al. | |
| 4,658,552 A | 4/1987 | Mulford | |
| 4,658,553 A * | 4/1987 | Shinagawa | A47F 3/0434 428/34 |
| 4,799,745 A | 1/1989 | Meyer et al. | |
| 4,831,799 A | 5/1989 | Glover et al. | |
| 5,007,217 A | 4/1991 | Glover et al. | |
| 5,071,206 A | 12/1991 | Hood et al. | |
| 5,079,054 A | 1/1992 | Davies | |
| 5,125,195 A | 6/1992 | Brede | |
| 5,173,800 A | 12/1992 | King | |
| 5,209,034 A | 5/1993 | Box et al. | |
| 5,270,092 A | 12/1993 | Griggith et al. | |
| 5,290,611 A | 3/1994 | Taylor | |
| 5,302,425 A | 4/1994 | Taylor | |
| 5,313,762 A | 5/1994 | Guillemet | |
| 5,424,111 A | 6/1995 | Farbstein | |
| 5,439,716 A | 8/1995 | Larsen | |
| 5,460,862 A | 10/1995 | Roller | |
| 5,512,341 A | 4/1996 | Newby et al. | |
| 5,655,282 A | 8/1997 | Hodek et al. | |
| 5,679,419 A | 10/1997 | Larsen | |
| 5,759,665 A | 6/1998 | Lafond | |
| 5,762,257 A | 6/1998 | Garrecht | |
| 5,773,135 A * | 6/1998 | Lafond | E06B 3/66328 428/192 |
| 5,851,627 A | 12/1998 | Farbstein | |
| 5,962,090 A | 10/1999 | Trautz | |
| 6,001,453 A | 12/1999 | Lafond | |
| 6,002,521 A * | 12/1999 | Town | E06B 3/6604 359/1 |
| 6,060,178 A | 5/2000 | Krisko | |
| 6,061,994 A | 5/2000 | Goer et al. | |
| 6,115,989 A | 9/2000 | Boone et al. | |
| 6,223,414 B1 | 5/2001 | Hodek et al. | |
| 6,250,045 B1 | 6/2001 | Goer et al. | |
| 6,250,245 B1 | 6/2001 | Robinson et al. | |
| 6,266,940 B1 * | 7/2001 | Reichert | E06B 3/66319 52/741.1 |
| 6,339,909 B1 | 1/2002 | Brunnhofer et al. | |
| 6,351,923 B1 | 3/2002 | Peterson | |
| 6,389,779 B1 | 5/2002 | Brunnhofer | |
| 6,391,400 B1 | 5/2002 | Russell | |
| 6,457,294 B1 | 10/2002 | Virnelson et al. | |
| 6,503,617 B2 | 1/2003 | Jacobsen et al. | |
| 6,528,131 B1 | 3/2003 | Lafond | |
| 6,537,629 B1 | 3/2003 | Ensinger | |
| 6,613,404 B2 | 9/2003 | Johnson | |
| 6,796,102 B2 | 9/2004 | Virnelson et al. | |
| 6,989,188 B2 | 1/2006 | Brunnhofer et al. | |
| 7,317,280 B2 | 1/2008 | Qiu et al. | |
| 7,827,760 B2 | 11/2010 | Brunnhofer et al. | |
| 7,858,193 B2 | 12/2010 | Ihlo et al. | |
| 7,997,037 B2 | 8/2011 | Crandell et al. | |
| 8,453,415 B2 | 6/2013 | Brunnhofer et al. | |
| 8,484,912 B2 | 7/2013 | Engelmeyer | |
| 8,640,406 B2 | 2/2014 | Brunnhofer et al. | |
| 8,701,363 B2 | 4/2014 | Schield | |
| 9,085,708 B2 | 7/2015 | Becker et al. | |
| 9,260,906 B2 | 2/2016 | Schreiber | |
| 9,487,994 B2 | 11/2016 | Lenz et al. | |
| 10,167,665 B2 | 1/2019 | Kuster et al. | |
| 2001/0001357 A1 | 5/2001 | Reichert | |
| 2002/0018891 A1 | 2/2002 | Jacobsen et al. | |
| 2002/0192473 A1 | 12/2002 | Gentilhomme et al. | |
| 2002/0194813 A1 | 12/2002 | Virnelson et al. | |
| 2003/0074859 A1 | 4/2003 | Reichert et al. | |
| 2004/0028953 A1 | 2/2004 | Kraemling | |
| 2004/0076815 A1 | 4/2004 | Reichert | |
| 2004/0163347 A1 | 8/2004 | Hodek et al. | |
| 2004/0256978 A1 | 12/2004 | Yu et al. | |
| 2005/0034386 A1 | 2/2005 | Crandell et al. | |
| 2005/0100691 A1 | 5/2005 | Bunnhofer et al. | |
| 2005/0170161 A1 | 8/2005 | Ramchandra et al. | |
| 2005/0214487 A1 | 9/2005 | Trautz | |
| 2005/0217718 A1 | 10/2005 | Dings et al. | |
| 2005/0287370 A1 | 12/2005 | Kaczmarek et al. | |
| 2006/0003138 A1 | 1/2006 | Kaczmarek et al. | |
| 2006/0130427 A1 | 6/2006 | Hodek et al. | |
| 2006/0150577 A1 | 7/2006 | Hodek et al. | |
| 2006/0162281 A1 | 7/2006 | Pettit et al. | |
| 2006/0260227 A1 | 11/2006 | Winfield | |
| 2007/0087140 A1 | 4/2007 | Dierks | |
| 2007/0122572 A1 | 5/2007 | Shibuya et al. | |
| 2007/0251180 A1 | 11/2007 | Gosling et al. | |
| 2007/0261358 A1 | 11/2007 | Davis et al. | |
| 2007/0261795 A1 | 11/2007 | Rosskamp et al. | |
| 2008/0053037 A1 | 3/2008 | Gallagher | |
| 2008/0134596 A1 | 6/2008 | Brunnhofer et al. | |
| 2009/0120019 A1 | 5/2009 | Trpkovski | |
| 2009/0120035 A1 | 5/2009 | Trpkovski | |
| 2009/0139165 A1 | 6/2009 | Prete et al. | |
| 2009/0186213 A1 | 7/2009 | Ihlo et al. | |
| 2009/0197077 A1 | 8/2009 | Reutler et al. | |
| 2009/0243802 A1 | 10/2009 | Wolf et al. | |
| 2009/0301637 A1 | 12/2009 | Reichert | |
| 2010/0011703 A1 | 1/2010 | Seele et al. | |
| 2010/0107529 A1 | 5/2010 | Engelmeyer | |
| 2011/0041427 A1 | 2/2011 | Bouesnard | |
| 2011/0275796 A1 | 11/2011 | Seilz et al. | |
| 2012/0132251 A1 | 5/2012 | Sedlacek et al. | |
| 2012/0141699 A1 * | 6/2012 | Mader | E06B 3/66366 428/34 |
| 2012/0192946 A1 | 8/2012 | Becker et al. | |
| 2012/0297707 A1 | 11/2012 | Lenz et al. | |
| 2012/0297708 A1 | 11/2012 | Brunnhofer et al. | |
| 2013/0079446 A1 | 3/2013 | Becker et al. | |
| 2014/0138425 A1 | 5/2014 | Meyer et al. | |
| 2014/0272207 A1 | 9/2014 | McKenna et al. | |
| 2014/0311065 A1 | 10/2014 | Schreiber | |
| 2014/0356557 A1 | 12/2014 | Reichert | |
| 2015/0107167 A1 | 4/2015 | Baumann et al. | |
| 2016/0069123 A1 | 3/2016 | Schreiber | |
| 2016/0138326 A1 | 5/2016 | Kuster et al. | |
| 2016/0201381 A1 | 7/2016 | Kuster et al. | |
| 2016/0290032 A1 | 10/2016 | Kuster et al. | |
| 2016/0290033 A1 | 10/2016 | Messere | |
| 2017/0152701 A1 | 6/2017 | Kuster et al. | |
| 2017/0298680 A1 | 10/2017 | Schreiber et al. | |
| 2018/0058139 A1 | 3/2018 | Schwerdt et al. | |

FOREIGN PATENT DOCUMENTS

| | | |
|---|---|---|
| CN | 1377329 A | 10/2002 |
| CN | 1678810 A | 10/2005 |
| DE | 2555384 C3 | 3/1982 |
| DE | 33 02 659 A1 | 8/1984 |
| DE | 2752542 C2 | 10/1989 |

(56) References Cited

FOREIGN PATENT DOCUMENTS

| | | |
|---|---|---|
| DE | 40 32 192 A1 | 6/1991 |
| DE | 4024697 A1 | 2/1992 |
| DE | 94 08 764 U1 | 10/1995 |
| DE | 44 32 402 A1 | 3/1996 |
| DE | 195 33 685 A1 | 3/1997 |
| DE | 196 02 455 A1 | 7/1997 |
| DE | 19625845 A1 | 1/1998 |
| DE | 19805348 A1 | 8/1999 |
| DE | 19807454 A1 | 8/1999 |
| DE | 198 29 151 C1 | 2/2000 |
| DE | 69607473 T2 | 9/2000 |
| DE | 19927683 C1 | 1/2001 |
| DE | 100 25 321 A1 | 1/2002 |
| DE | 103 56 216 A1 | 7/2005 |
| DE | 102009006 062 A1 | 7/2010 |
| DE | 10 2009 057 156 A1 | 6/2011 |
| DE | 102010006 127 A1 | 8/2011 |
| DE | 202012104026 U1 | 10/2013 |
| DE | 69633132 T2 | 8/2015 |
| EP | 0 078 530 A2 | 5/1983 |
| EP | 0 154 428 A2 | 9/1985 |
| EP | 0261923 A2 | 3/1988 |
| EP | 0430889 A2 | 6/1991 |
| EP | 0 612 119 A1 | 8/1994 |
| EP | 0852280 A1 | 7/1998 |
| EP | 0865560 B1 | 8/2004 |
| EP | 1 607 216 A1 | 12/2005 |
| EP | 1 607 217 A1 | 12/2005 |
| EP | 0912455 B1 | 5/2006 |
| EP | 1 892 365 A1 | 2/2008 |
| EP | 1218307 B1 | 7/2008 |
| EP | 1917222 B1 | 3/2009 |
| EP | 2 218 862 A2 | 8/2010 |
| EP | 2 2703 07 A2 | 1/2011 |
| EP | 2 359 973 A2 | 8/2011 |
| EP | 2363565 A2 | 9/2011 |
| EP | 2420536 A1 | 2/2012 |
| EP | 2 5841 35 A2 | 4/2013 |
| EP | 2628884 A2 | 8/2013 |
| EP | 2 802 726 B1 | 4/2016 |
| FR | 2205620 A1 | 5/1974 |
| FR | 2 799 005 A1 | 3/2001 |
| GB | 1 203 999 A | 9/1970 |
| GB | 2 103 999 A | 3/1983 |
| GB | 2 210 899 A | 6/1989 |
| JP | H09175843 A | 7/1997 |
| JP | H11189439 A | 7/1999 |
| JP | 2002-504639 A | 2/2002 |
| JP | 2008-019131 A | 1/2008 |
| WO | 97/48649 A1 | 12/1997 |
| WO | 98/28513 A1 | 7/1998 |
| WO | 99/41481 A1 | 8/1999 |
| WO | 01/16046 A1 | 3/2001 |
| WO | 2004/005783 A1 | 1/2004 |
| WO | 2007/042688 A1 | 4/2007 |
| WO | 2007/101964 A1 | 9/2007 |
| WO | 2008/022877 A1 | 2/2008 |
| WO | 2010/034781 A2 | 4/2010 |
| WO | 2010/115456 A1 | 10/2010 |
| WO | 2011/088994 A2 | 7/2011 |
| WO | 2012/095266 A1 | 7/2012 |
| WO | 2012/140005 A1 | 10/2012 |
| WO | 2013/104507 A1 | 7/2013 |
| WO | 2014/198429 A1 | 12/2014 |
| WO | 2014/198431 A1 | 12/2014 |

OTHER PUBLICATIONS

Advisory Action issued for U.S. Appl. No. 14/942,902, filed Nov. 16, 2015 on behalf of Saint-Gobain Glass France, dated Jan. 5, 2017. 4 pages.
Amcor. Ceramis Coating Technology, 12 pages, Oct. 2012, available at http://amcor.com/CMSPages/GetFile.aspx?guid=dbab33c8-3471-4e86-aa69-57dc76b525c1.
Final Office Action issued for U.S. Appl. No. 14/357,164, filed May 8, 2014 on behalf of Saint-Gobain Glass France, dated Feb. 9, 2015. 16 pages.
Final Office Action issued for U.S. Appl. No. 14/942,902, filed Nov. 16, 2015 on behalf of Saint-Gobain Glass France, dated Sep. 26, 2016. 33 pages.
Final Office Action issued for U.S. Appl. No. 14/909,073, filed Nov. 16, 2015 on behalf of Saint-Gobain Glass France, dated Sep. 12, 2017. 29 pages.
Final Office Action issued for U.S. Appl. No. 14/942,902, filed Jan. 29, 2016 on behalf of Saint-Gobain Glass France, dated Jun. 20, 2017. 25 pages.
International Preliminary Report on Patentability issued for International Patent Application No. PCT/EP2012/076341, filed on behalf of Saint-Gobain Glass France, dated Jul. 15, 2014. 17 pages (English Translation + German Original).
International Preliminary Report on Patentability issued for International Patent Application No. PCT/EP2014/067901, filed on behalf of Saint-Gobain Glass France, dated Apr. 5, 2016. 15 pages (English Translation + German Original).
International Preliminary Report on Patentability issued for International Patent Application No. PCT/EP2014/076736, filed on behalf of Saint-Gobain Glass France, dated Jun. 14, 2016. 12 pages (English Translation + German Original).
International Preliminary Report on Patentability issued for International Patent Application No. PCT/EP2014/076739, filed on behalf of Saint-Gobain Glass France, dated Jun. 14, 2016. 16 pages (English Translation + German Original).
International Search Report issued for International Patent Application No. PCT/EP2012/076341, filed on behalf of Saint-Gobain Glass France, dated Feb. 8, 2013. 6 pages (English Translation + German Original).
International Search Report issued for International Patent Application No. PCT/EP2014/067901, filed on behalf of Saint-Gobain Glass France, dated Oct. 7, 2014. 5 pages (English Translation + German Original).
International Search Report issued for International Patent Application No. PCT/EP2014/076736, filed on behalf of Saint-Gobain Glass France, dated Mar. 10, 2016. 5 pages (English Translation + German Original).
International Search Report issued for International Patent Application No. PCT/EP2014/076739, filed on behalf of Saint-Gobain Glass France, dated Feb. 3, 2015. 7 pages (English Translation + German Original).
International Search Report issued for International Patent Application No. PCT/EP2015/063821, filed on behalf of Saint-Gobain Glass France, dated Aug. 19, 2015. 5 pages (English Translation + German Original).
International Search Report issued for International Patent Application No. PCT/EP2016/054226, filed on behalf of Saint-Gobain Glass France, dated May 3, 2016. 5 pages (English Translation + German Original).
Non-Final Office Action issued for U.S. Appl. No. 14/357,164, filed May 8, 2014 on behalf of Saint-Gobain Glass France, dated Sep. 10, 2014. 24 pages.
Non-Final Office Action issued for U.S. Appl. No. 14/357,164, filed May 8, 2014 on behalf of Saint-Gobain Glass France, dated Aug. 10, 2015. 14 pages.
Non-Final Office Action issued for U.S. Appl. No. 14/942,902, filed Nov. 16, 2015 on behalf of Saint-Gobain Glass France, dated Mar. 10, 2016. 28 pages.
Non-Final Office Action issued for U.S. Appl. No. 14/942,902, filed Nov. 16, 2015 on behalf of Saint-Gobain Glass France, dated Apr. 4, 2017. 23 pages.
Non-Final Office Action issued for U.S. Appl. No. 14/942,902, filed Nov. 16, 2015 on behalf of Saint-Gobain Glass France, dated Jan. 3, 2018. 20 pages.
Non-Final Office Action issued for U.S. Appl. No. 14/942,902, filed Nov. 16, 2015 on behalf of Saint-Gobain Glass France, dated Apr. 2, 2018. 21 pages.
Non-Final Office Action issued for U.S. Appl. No. 14/909,073, filed Jan. 29, 2016 on behalf of Saint-Gobain Glass France, dated Apr. 4, 2017. 23 pages.

(56) References Cited

OTHER PUBLICATIONS

Non-Final Office Action issued for U.S. Appl. No. 14/909,073, filed Jan. 29, 2016 on behalf of Saint-Gobain Glass France, dated Aug. 25, 2017. 26 pages.
Non-Final Office Action issued for U.S. Appl. No. 15/038,356, filed May 20, 2016 on behalf of Saint-Gobain Glass France, dated Feb. 22, 2018. 24 pages.
Non-Final Office Action issued for U.S. Appl. No. 15/038,298, filed May 20, 2016 on behalf of Saint-Gobain Glass France, dated Dec. 28, 2017. 15 pages.
Non-Final Office Action issued for U.S. Appl. No. 15/321,170, filed Dec. 21, 2016 on behalf of Saint-Gobain Glass France, dated Mar. 22, 2018. 24 pages.
Notice of Allowance issued for U.S. Appl. No. 14/357,164, filed May 8, 2014 on behalf of Saint-Gobain Glass France, dated May 18, 2015. 12 pages.
Notice of Allowance issued for U.S. Appl. No. 14/357,164, filed May 8, 2014 on behalf of Saint-Gobain Glass France, dated Jun. 22, 2015. 8 pages.
Notice of Allowance issued for U.S. Appl. No. 14/357,164, filed May 8, 2014 on behalf of Saint-Gobain Glass France, dated Sep. 28, 2015. 12 pages.
Notice of Allowance issued for U.S. Appl. No. 14/357,164, filed May 8, 2014 on behalf of Saint-Gobain Glass France, dated Nov. 23, 2015. 14 pages.
Notice of Allowance issued for U.S. Appl. No. 14/038,298, filed May 20, 2016 on behalf of Saint-Gobain Glass France, dated May 31, 2018. 12 pages.
Restriction Requirement issued for U.S. Appl. No. 15/038,356, filed May 20, 2016 on behalf of Saint-Gobain Glass France, dated Jan. 16, 2018. 7 pages.
Written Opinion issued for International Patent Application No. PCT/EP2012/076341, filed on behalf of Saint-Gobain Glass France, dated Feb. 8, 2013. 15 pages (English Translation + German Original).
Written Opinion issued for International Patent Application No. PCT/EP2014/067901, filed on behalf of Saint-Gobain Glass France, dated Oct. 7, 2014. 13 pages (English Translation + German Original).
Written Opinion issued for International Patent Application No. PCT/EP2014/076736, filed on behalf of Saint-Gobain Glass France, dated Mar. 10, 2016. 10 pages (English Translation + German Original).
Written Opinion issued for International Patent Application No. PCT/EP2014/076739, filed on behalf of Saint-Gobain Glass France, dated Feb. 3, 2015. 14 pages (English Translation + German Original).
Written Opinion issued for International Patent Application No. PCT/EP2015/063814, filed on behalf of Saint-Gobain Glass France, dated Aug. 14, 2015. 16 pages.
Written Opinion issued for International Patent Application No. PCT/EP2015/063821, filed on behalf of Saint-Gobain Glass France, dated Aug. 19, 2015. 16 pages (English Translation + German Original).
Written Opinion issued for International Patent Application No. PCT/EP2016/054226, filed on behalf of Saint-Gobain Glass France, dated May 3, 2016. 9 pages (English Translation + German Original).
Opposition by opponent Camvac Limited in European Patent 2,802,726 B1, issued Apr. 27, 2016 to Saint-Gobain Glass France. Mail date: Jan. 27, 2017. 16 pages.
Annex A to opposition by opponent Camvac Limited. "Press notes and articles from 2011". May-Aug. 2011. 4 pages.
Annex B to opposition by opponent Camvac Limited. "Invoices and delivery notes from Thermoseal Group Ltd from Aug. 2011 to Dec. 2011". Aug.-Dec. 2011. 24 pages.
Annex BB to opposition by opponent Camvac Limited. "Invoice and delivery note from Thermoseal Group Ltd of Aug. 2011". Aug. 2011. 2 pages.

Annex C1 to opposition by opponent Camvac Limited. "Thermobar production sheets from Thermoseal Group Ltd of Dec. 22, 2011 and Dec. 23, 2011". Dec. 22 and 23, 2011. 2 pages.
Annex C2 to opposition by opponent Camvac Limited. "Stock Control from Thermoseal Group Ltd from Jun. 8, 2011 to Dec. 22, 2011". Jun. 8, 2011-Dec. 22, 2011. 14 pages.
Annex C3 to opposition by opponent Camvac Limited. "Invoices No. 47197, 47486 and 47812 from Lohmann of Jun. 30, 2011, Aug. 26, 2011 and Oct. 31, 2011". Jun. 30, 2011, Aug. 26, 2011, and Oct. 31, 2011. 3 pages.
Annex CC1 to opposition by opponent Camvac Limited. "Thermobar production sheets from Thermoseal Group Ltd of Aug. 8, 2011 and Sep. 26, 2011". Aug. 8, 2011 and Sep. 26, 2011. 2 pages.
Annex CC2 to opposition by opponent Camvac Limited. "Stock Control from Thermoseal Group Ltd of Jul. 29, 2011 and Sep. 6, 2011". Jul. 29, 2011 and Sep. 6, 2011. 1 page.
Annex CC3 to opposition by opponent Camvac Limited. "Invoice No. 47340 from Lohmann of Jul. 29, 2011". Jul. 29, 2011. 1 page.
Annex E to opposition by opponent Camvac Limited. "Delivery Notes with purchase order Nos. 7621, 7684, 7756, 7757 and 7832 from Camvac Limited of May 24, 2011, Jun. 8 and 29, 2011, Jul. 22, 2011 and Aug. 18, 2011". May 24, 2011, Jun. 8, 2011, Jun. 29, 2011, Jul. 22, 2011, and Aug. 18, 2011. 5 pages.
Annex F1A to opposition by opponent Camvac Limited. "Screen shot of Data Sheet12/12 Cambrite film from Camvac". Jan. 19, 2017. 1 page.
Annex F1B to opposition by opponent Camvac Limited. "Declaration of Mr Gary Chalkley (Camvac Product Development Director)". Jan. 24, 2017. 1 page.
Annex F2 to opposition by opponent Camvac Limited. "Declaration of Mr. James Shipman (Camvac Process Development Manager)". Jan. 24, 2017. 2 pages.
Annex G to opposition by opponent Camvac Limited. "Data sheet PSI values for windows having a Thermobar Warm Edge Spacer". Nov. 2014. 1 page.
Opposition by opponent Ensinger GmbH in European Patent 2,802,726 B1, issued Apr. 27, 2016 to Saint-Gobain Glass France. Mail date: Jan. 27, 2017. 44 pages. (English Translation + German Original).
Annex D1A to opposition by opponent Ensinger GmbH. "Affidavit of Mr. Marc Rehling". Jan. 24, 2017. 4 pages.(English Translation + German Original).
Annex D1C to opposition by opponent Ensinger GmbH "Test Report AP 16-11-98". Nov. 2016. 8 pages. (German Original Only).
Annex D1E to opposition by opponent Ensinger GmbH. "ATR-Infrared Spectroscopy Measurement of the "Thermobar" Spacer". Dec. 12, 2016. 2 pages. (English Translation + German Original).
Annex D1F to opposition by opponent Ensinger GmbH. "Expert Opinion on "Thermobar" Spacer". Jan. 18, 2017. 14 pages. (English Translation + German Original).
Annex D2 to opposition by opponent Ensinger GmbH. "DIN EN ISO 10077-1 in the version dated May 2010". May 2010. 48 pages. (English Translation + German Original).
Annex D7 to opposition by opponent Ensinger GmbH. "Avis Technique [Technical Evaluation] 06/04-1562 regarding the Super Spacer Premium and the Super Spacer Premium Plus the Edgetech Europe GmbH". Jan. 4, 2005. 46 pages. (English Translation + German Original).
Opposition by opponent Helima GmbH in European Patent 2,802,726 B1, issued Apr. 27, 2016 to Saint-Gobain Glass France. Mail date: Jan. 27, 2017. 159 pages. (English Translation + German Original).
Supplement to opposition by opponent Helima GmbH in European Patent 2,802,726 B1, issued Apr. 27, 2016 to Saint-Gobain Glass France. Mail date: Mar. 23, 2017. 6 pages. (English Translation + German Original).
Annex A1 to opposition by opponent Helima GmbH. "Excerpt from the website of the company Viking regarding Window DK88". Sep. 2012. 4 pages.
Annex A2 to opposition by opponent Helima GmbH. "Excerpt from the Polish website of the patent holder". Nov. 12, 2012. 3 pages. (English Translation + German Original).
Annex A3 to opposition by opponent Helima GmbH. "Technical Opinion 6/13-2124*01 Add of the CSTB". Sep. 24, 2014. 60 pages. (English Translation + French Original).

(56) References Cited

OTHER PUBLICATIONS

Annex A4 to opposition by opponent Helima GmbH. "Technical Opinion 6/16-2303 of the CSTB". Jun. 30, 2016. 62 pages. (English Translation + French Original).
Annex A5 to opposition by opponent Helima GmbH. "Datasheet Swisspacer Ultimate". Apr. 2013. 2 pages. (English Translation + German Original).
Annex A6 to opposition by opponent Helima GmbH. "Excerpt from AIMCAL "Metallizing Technical Reference"". May 2012. 2 pages.
Annex A7 to opposition by opponent Helima GmbH. "Excerpt from Frick/Knoll: Baukonstruktionslehre [Structural Design Theory] 2, Ed.34". Hestermann and Rongen, "Frick/Knöll Baukonstruktionslehre 2", pp. 371-372, 2013. 4 pages. (German Original Only).
Annex A8 to opposition by opponent Helima GmbH. "Affidavit". Jan. 27, 2017. 2 pages.
Annex A9 to opposition by opponent Helima GmbH. "Datasheet Sanco ACS Thermix". Jun. 2009. 5 pages. (English Translation + German Original).
Annex A10 to opposition by opponent Helima GmbH. "Barrier films for vacuum insulation panels (VIP)". Kaczmarek, "Barrier films for vacuum insulation panels (VIP)", 7th International Vacuum Insulation Symposium 2005, pp. 91-98, 2005. 8 pages.
Opposition by opponent Rolltech A/S in European Patent 2,802,726 B1, issued Apr. 27, 2016 to Saint-Gobain Glass France. Mail date: Jan. 27, 2017. 32 pages.
Annex O1i to opposition by opponent Rolltech A/S. "Ceramis Barrier Films by Alcan Packaging". Mar. 2005. 4 pages.
Annex O1ii to opposition by opponent Rolltech A/S. "'Barrier Films: SiOx Barrier Benefits' by Marius Breune in Paper, Film & Foil Converter". Oct. 1, 2010. 4 pages.
Opposition by opponent Technoform Glass Insulation Holding GmbH in European Patent 2,802,726 B1, issued Apr. 27, 2016 to Saint-Gobain Glass France. Mail Date: Jan. 26, 2017. 55 pages. (English Translation + German Original).
Annex E6a to opposition by opponent Technoform Glass Insulation Holding GmbH. "ISO 10077-1 in the version of 2006". Sep. 15, 2006. 42 pages.
Annex E6b to opposition by opponent Technoform Glass Insulation Holding GmbH. "ISO 10077-2 in the version of 2012". Mar. 1, 2012. 44 pages.
Annex E6c to opposition by opponent Technoform Glass Insulation Holding GmbH. "two data sheets Saint-Gobain Swisspacer from 2008". Oct. 2008. 2 pages.
Opposition by opponent Thermoseal Group Ltd in European Patent 2,802,726 B1, issued Apr. 27, 2016 to Saint-Gobain Glass France. Mail date: Jan. 27, 2017. 20 pages.
Annex A to opposition by opponent Thermoseal Group Ltd. "Press notes and articles from 2011". May-Sep. 2011. 4 pages.
Annex B to opposition by opponent Thermoseal Group Ltd. "Invoices and delivery notes from Thermoseal Group Ltd from Aug. 2011 to Dec. 2011". Aug.-Dec. 2011. 24 pages.
Annex BB to opposition by opponent Thermoseal Group Ltd. "Invoice and delivery note from Thermoseal Group Ltd of Aug. 2011". Aug. 2011. 2 pages.
Annex C1 to opposition by opponent Thermoseal Group Ltd. "Thermobar production sheets from Thermoseal Group Ltd of Dec. 22, 2011 and Dec. 23, 2011". Dec. 22 and 23, 2011. 2 pages.
Annex C2 to opposition by opponent Thermoseal Group Ltd. "Stock Control from Thermoseal Group Ltd from Jun. 8, 2011 to Dec. 22, 2011". Jun. 8, 2011-Dec. 22, 2011. 14 pages.
Annex C3 to opposition by opponent Thermoseal Group Ltd. "Invoices No. 47197, 47486 and 47812 from Lohmann of Jun. 30, 2011, Aug. 26, 2011 and Oct. 31, 2011". Jun. 30, 2011, Aug. 26, 2011, Oct. 31, 2011. 3 pages.
Annex CC1 to opposition by opponent Thermoseal Group Ltd. "Thermobar production sheets from Thermoseal Group Ltd of Aug. 8, 2011 and Sep. 26, 2011". Aug. 8, 2011 and Sep. 26, 2011. 2 pages.
Annex CC2 to opposition by opponent Thermoseal Group Ltd. "Stock Control from Thermoseal Group Ltd of Jul. 29, 2011 and Sep. 6, 2011". Jul. 29, 2011 and Sep. 6, 2011. 1 page.
Annex CC3 to opposition by opponent Thermoseal Group Ltd. "Invoice No. 47340 from Lohmann of Jul. 29, 2011". Jul. 29, 2011. 1 page.
Annex D2 to opposition by opponent Thermoseal Group Ltd. "Declaration of Ms Amanda Smith (Lohmann Segment Manager)". Jan. 18, 2014. 1 page.
Annex E to opposition by opponent Thermoseal Group Ltd. "Delivery Notes with purchase order Nos. 7621, 7684, 7756, 7757 and 7832 from Camvac Limited of May 24, 2011, Jun. 8 and 29, 2011, Jul. 22, 2011 and Aug. 18, 2011". Jul. 22, 2011 and Aug. 18, 2011. 6 pages.
Annex F1A to opposition by opponent Thermoseal Group Ltd. "Screen shot showing the last date that the 12/12 Cambrite film from Camvac data sheet was modified". Jan. 19, 2017. 1 page.
Annex F2 to opposition by opponent Thermoseal Group Ltd. "Declaration of Mr James Shipman (Camvac Process Development Manager)". Jan. 24, 2017. 2 pages.
Annex G to opposition by opponent Thermoseal Group Ltd. "Data sheet PSI values for windows having a Thermobar Warm Edge Spacer". Nov. 2014. 1 page.
Annex D1C to opposition by opponent Ensinger GmbH (Jan. 27, 2017) in European Patent 2,802,726 B1 (issued to Saint-Gobain Glass France). "Test Report, Light micrographs of two existing polished sections with the designation 2010 und 2011", Institute of Polymertechnology, Nov. 2016, 16 pages (English Translation + German Original).
Annex A7 to opposition by opponent Helima GmbH (Jan. 27, 2017) in European Patent 2,802,726 B1 (issued to Saint-Gobain Glass France). Hestermann and Rongen, "Frick/Knöll Baukonstruktionslehre 2", pp. 371-372, 1996-2013, 10 pages (English Translation + German Original).
Response to notices of opposition against European Patent EP 2 802 726 B1 by the companies Technoform Glass Insulation Holding GmbH (O1), Ensinger GmbH (O2), Camvac Limited (O3), Thermoseal Group Limited (O4), Rolltech A/S (O5), Helima GmbH (O6). Mail Date: Aug. 22, 2017. 119 pages (English Translation + German Original).
M.W. Phaneuf, "Applications of focused ion beam microscopy to materials science specimens", Micron 30. Jan. 28, 1999. pp. 277-288. 12 pages.
Bishop et al., "Metallizing Technical Reference", AIMCAL, May 2012. Title and pp. 21-25. 6 pages.
Reply by opponent Rolltech A/S in European Patent 2,802,726 B1, issued Apr. 27, 2016 to Saint-Gobain Glass France. Mail date: Feb. 1, 2018. 8 pages.
Exhibit S27c to reply by opponent Rolltech A/S in European Patent 2,802,726 B1, issued Apr. 27, 2016 to Saint-Gobain Glass France. Sep. 12, 2017. 2 pages.
Exhibit S27d to reply by opponent Rolltech A/S in European Patent 2,802,726 B1, issued Apr. 27, 2016 to Saint-Gobain Glass France. Oct. 2010. 6 pages.
Reply by opponent Technoform Glass Insulation Holding GmbH in European Patent 2,802,726 B1, issued Apr. 27, 2016 to Saint-Gobain Glass France. Mail Date: Apr. 20, 2018. 15 pages. (English Translation + German Original).
Response by patentee Saint-Gobain Glass France to opponent's reply papers in European Patent 2,802,726 B1, issued Apr. 27, 2016 to Saint-Gobain Glass France. Mail date: Jun. 18, 2018. 32 pages (English Translation + German Original).
Annex A7 to Opposition by Opponent Helima GmbH, Excerpt from Frick/Knoll: Baukonstruktionslehre [Structural Design Theory] 2, Ed.34, Hestermann and Rongen, Frick/Knoll Baukonstruktionslehre 2, 2013, 10 pages (English Translation+ German Original).
Annex D1C to Opposition by Opponent Ensinger GmbH Test Report AP 16-11-98, Nov. 2016, 16 pages (English Translation +German Original).
Delstar Technologies online catalog, Delstar catalogs Delnet as a Nets/Mesh/Apertured Film Downloaded from the internet on Feb. 14, 2017, (http://extrudedfilmsandnets.co.uk/products/product-types/nets-meshapertured- film), 1 page.

(56) References Cited

OTHER PUBLICATIONS

Delstar Technologies online catalog, Delstar catalogs Delnet as a Search/Category-all/Net Downloaded from the internet on Feb. 14, 2017, (http://extrudedfilmsandnets.co.uk/products/finder/search/category-all/net), 1 page.
Final Office Action for U.S. Appl. No. 14/909,073, filed Jan. 29, 2016 on behalf of Saint-Gobain Glass France, dated Jun. 20, 2017. 23 pages.
Final Office Action for U.S. Appl. No. 14/942,902, filed Nov. 16, 2015 on behalf of Saint-Gobain Glass France, dated Sep. 12, 2017. 29 pages.
Final Office Action for U.S. Appl. No. 14/942,902, filed Nov. 16, 2015, on behalf of Saint-Gobain Glass France, dated Sep. 14, 2018. 21 pgs.
International Search Report for International Application No. PCT/EP2014/053714 filed Feb. 26, 2014 on behalf of Saint-Gobain Glass France, dated Mar. 25, 2014. 7 pages (German original + English Translation).
International Search Report for International Application No. PCT/EP2014/054710 filed Mar. 11, 2014 on behalf of Saint-Gobain Glass France, dated Apr. 4, 2014. 5 pages (German original + English Translation).
International Search Report for International Application No. PCT/EP2015/071452 filed Sep. 18, 2015 on behalf of Saint-Gobain Glass France, dated Dec. 2, 2015. 7 pages (English Translation + German Original).
Notice of Allowance for U.S. Appl. No. 15/038,298, filed May 20, 2016, on behalf of Saint-Gobain Glass France, dated Oct. 9, 2018. 14 pgs.
Notice of Allowance for U.S. Appl. No. 15/038,356, filed May 20, 2016, on behalf of Saint-Gobain Glass France, dated Oct. 15, 2018. 8 pgs.
Opposition by Opponent Helima GMBH in European Patent Application No. 2802726 B1, Mail date: Nov. 24, 2017, 14 pages (German Original+ English translation).
Restriction Requirement for U.S. Appl. No. 15/321,170, filed Dec. 21, 2016, on behalf of Saint-Gobain Glass France, dated Oct. 5, 2018. 8 pgs.
Restriction Requirement for U.S. Appl. No. 15/506,229, filed Feb. 23, 2017 on behalf of Saint-Gobain Glass France, dated Aug. 23, 2018. 6 pages.
Sua Sponte Withdrawal for U.S. Appl. No. 14/942,902, Mail Date: Feb. 2, 2018, 2 pages.
Written Opinion for Application No. PCT/EP2014/053714 filed Feb. 26, 2014 on behalf of Saint-Gobain Glass France, dated Mar. 25, 2014. 10 pages (German original+ English Translation).
Written Opinion for Application No. PCT/EP2014/054710 filed Mar. 11, 2014 on behalf of Saint-Gobain Glass France, dated Apr. 4, 2014. 12 pages (German original+ English Translation).
Written Opinion for International Application No. PCT/EP2015/071452 filed Sep. 18, 2015 on behalf of Saint-Gobain Glass France, dated Dec. 2, 2015. 11 pages. (English Translation + German Original).
Zimmermann M., 7th International Vacuum Insulation Symposium 2005, Table of Contents, Sep. 2005, 4 pages.
EPO Preliminary Opinion for European Patent Application No. 12806056.3 filed Jun. 11, 2014 on behalf of Saint-Gobain Glass France, dated Jul. 23, 2018. 34 pages (English Translation + German Original).
Non-Final Office Action for U.S. Appl. No. 15/506,229, filed Feb. 23, 2017, on behalf of Saint-Gobain Glass France, dated Dec. 20, 2018. 24 pages.

* cited by examiner

INSULATED GLAZING WITH SPACER, RELATED METHODS AND USES

CROSS REFERENCE TO RELATED APPLICATIONS

The present application is the U.S. national stage entry of International Patent Application No. PCT/EP2015/063814, filed internationally on Jun. 19, 2015, which, in turn, claims priority to European Patent Application No. 14174745.1, filed on Jun. 27, 2014.

The invention relates to an insulating glazing unit with a spacer, a method for its production, and its use.

The thermal conductivity of glass is lower by roughly a factor of 2 to 3 than that of concrete or similar building materials. However, since panes are usually designed significantly thinner than comparable elements made of brick or concrete, buildings frequently lose the greatest share of heat via external glazing. This effect is particularly notable in high-rise buildings with partial or complete glass façades. The increased costs necessary for heating and air-conditioning systems make up a part of the maintenance costs of the building that must not be underestimated. Moreover, as a consequence of more stringent construction regulations, lower carbon dioxide emissions are required. Insulating glazing units, without which, primarily as a result of increasingly rapidly rising prices of raw materials and more stringent environmental protection constraints, it is no longer possible to imagine the building construction sector, are an important approach to a solution for this.

The construction of insulating glazing units consisting of two or more panes is known. Insulating glazing units are manufactured from at least two panes that are connected to one another via at least one circumferential spacer. Depending on the embodiment, the space between the two panes, referred to as the "glazing interior", is filled with air or gas, but in any case free of moisture. An excessive moisture content in the glazing interior results, in particular in the case of cold external temperatures, in the condensation of drops of water in the pane interspace, which absolutely must be avoided. To absorb the residual moisture remaining in the system after assembly, spacers that contain a desiccant can, for example, be used. However, since the absorption capacity of the desiccant is limited, even in this case, the sealing of the system is of enormous importance to prevent the penetration of further moisture. In the case of gas-filled insulating glazing units into whose glazing interior an argon filling, for example, is introduced, gas tightness must also be ensured. One or a plurality of layers of a sealing means and, if need be, film prevent gas and moisture exchange between the pane interspace and the environment and also contribute to the mechanical stability of the insulating glass element.

Spacers made of different materials are known. Spacers made of materials with high thermal conductivity, for example, aluminum, have the disadvantage that they result in severe cooling of the pane edge in the case of low external temperatures, which degrades the thermal insulation and can result in the formation of condensation water on the pane on the building-interior side.

Spacers made of materials with lower thermal conductivity are consequently preferred (so-called "warm edge" systems). Spacers made of polymeric materials have these improved thermal insulating properties. Dimensionally stable plastic profiles that contain desiccants in cavities or recesses or a desiccant-filled matrix are known, for example. Often, these multicomponent spacers must be assembled in a plurality of individual process steps, which makes production costly. One possibility for simplifying production is to coextrude the individual components and thus to save production steps.

The use of thermoplastic materials for producing spacers that are produced either as a prefabricated profile and subsequently fixed between the panes or extruded directly onto the pane is known. In the first case, the pane contact surfaces of the spacer must be provided with an adhesive in a separate production step. The material properties must be precisely coordinated with one another to prevent detachment of the spacer from the pane.

In the German translation DE 696 33 132 T2 of the patent EP 0 865 560 B1, a composite spacer made of cellular material is described, which contains a desiccant in a channel. The composite spacer and the desiccant can be coextruded. The matrix containing the desiccant is arranged to form the pane interior and is visible to the end user. This matrix is unsuitable for labeling the pane. Preferably, for sealing the insulating glazing unit, a separate vapor barrier is installed on the side of the spacer facing the outer edge of the glazing, since the cellular material is preferably porous.

Injectable thermoplastic spacers (TPS spacers) made of sealing materials such as polyisobutylene and butyl rubber are known, which contain desiccants in the matrix, such that a step for filling hollow bodies in dimensionally stable spacers is omitted. In addition, with these spacers, no separate sealing means or adhesive is required since the spacer itself is already made from an appropriate sealing material. These spacers can be applied directly on the pane. For producing insulating glazing units with more than two panes, two strips of sealing material can be applied simultaneously on two sides of a center pane at the same height such that the stringent requirements for the assembly of triple insulating glazing units are met. These injectable thermoplastic spacers are darkly colored, have a rough surface, and are, consequently, not very attractive visually, and cannot be inscribed for the purpose of pane labeling. During production of the injectable spacers, inaccuracies can occur that result in unevenness on the pane surface. This unevenness results, in the insulating glazing unit, in tensions and, ultimately, in failure of the leakproof bond between the pane and the spacer.

DE 25 55 384 C3 discloses an intermediate layer made of a plastic material with an integrated desiccant, wherein the intermediate layer contains desiccant over its entire cross-section. The intermediate layer accordingly serves as spacer and sealing means. The desiccant included reduces the adhesive action of the sealing means and can, over time, result in the fact that the layer detaches and migrates into the visible region of the pane interspace (so-called "garland effect"). To solve this problem, butyl sealing materials with reactive groups can be modified, resulting in improved adhesion to the glass substrate. EP 2 420 536 A1 discloses a sealing compound consisting of a primary sealant and a secondary sealant, wherein the primary sealant contains a modified polymer with specific reactive groups and the secondary sealant is a silicone-based sealant. The spacers are darkly colored and not very attractive visually.

EP 0 261 923 A2 discloses a multipane insulating glazing unit with a spacer made of a moisture permeable foam with an integrated desiccant. The spacer is affixed using suitable adhesives, which makes an additional process step necessary. To ensure the gas leakproofness of the arrangement, an additional coated film is applied on the spacer.

The object of the present invention is to provide an insulating glazing unit that does not have the disadvantages mentioned and, in particular, is visually attractive, and to provide an economical method for producing such an insulating glazing unit.

The object of the present invention is surprisingly accomplished according to the invention by an insulating glazing unit according to the various embodiments described in the present disclosure.

The insulating glazing unit according to the invention comprises at least a first pane, a second pane, an inner pane interspace, an outer pane interspace, and a spacer. The spacer comprises at least one glazing interior surface, one first pane contact surface, and one second pane contact surface, at least one plastic profile, a primary sealing means, and a main member, with the main member made of a sealing material that contains a drying material. The plastic profile is arranged on the glazing interior surface and separates the outer pane interspace from the inner pane interspace. The plastic profile defines the distance between the adjacent panes. Since the plastic profile can be manufactured without unevenness, its use has advantages compared to spacers made of exclusively thermoplastic materials. The plastic profile is visually attractive and can be inscribed, for example, for the purpose of product labeling. The main member composed of sealing material with desiccant is arranged in the outer pane interspace adjacent the plastic profile. The sealing material is an adhesive sealing compound, i.e., in addition to sealing properties, it also has adhesive properties and can adhesively bond two glass panes. Due to these properties, the main member can also fix the plastic profile durably in position. It also contains the desiccant for binding any moisture present in the inner pane interspace. Arranged in the outer pane interspace adjacent the main member is the primary sealing means, which seals the glazing interior enclosed by the circumferential spacer and the panes against gas exchange and penetration of moisture.

The first pane contact surface and the second pane contact surface are the sides of the spacer against which, after installation of the spacer, the outer panes (first pane and second pane) of the insulating glazing unit abut. The first pane contact surface and the second pane contact surface run parallel to one another.

The glazing interior surface it is defined as the surface of the spacer that faces, after installation of the spacer in an insulating glazing unit, in the direction of the interior of the glazing. The plastic profile is arranged on the glazing interior surface.

In a first preferred embodiment, the insulating glazing unit comprises a third pane arranged between the first pane and the second pane, a glazing interior surface comprising a first glazing interior surface and a second glazing interior surface. The first glazing interior surface is arranged between the first and the third pane, and the second glazing interior surface is arranged between the third and the second pane. The plastic profile is, in this case, divided into two parts and comprises a first plastic profile on the first glazing interior surface between the first pane and the third pane and a second plastic profile on the second glazing interior surface between the third pane and the second pane. The main member is arranged in the outer pane interspace between the first and the second pane and the third pane protrudes between the first and the second plastic profile into the main member. The third pane preferably does not protrude into the primary sealing means. Through the use of simple to produce plastic profiles with variable width, variations of the pane thickness and the distance between panes can be readily realized. The dimensions of the main member made of sealing material can likewise be varied in a simple manner.

In another preferred embodiment, the primary sealing means is arranged in the outer pane interspace adjacent the main member and the pane contact surfaces between the main member and the outer panes (first and second pane). In this arrangement, the main member is surrounded on three sides by a primary sealing means and delimited toward the inner pane interspace by the plastic profile, i.e., the first and second pane contact surface surrounds the plastic profile and the primary sealing means, but not the main member. The primary sealing means has better adhesive properties than the material of the main member, which also includes desiccant, in addition to the sealing material. Through the arrangement of the primary sealing means additionally on the pane contact surfaces, the leakproofness and the stability of the arrangement are improved.

In a preferred embodiment, the main member and the primary sealing means are implemented in one piece, preferably coextruded. By means of the coextrusion, a particularly strong bond between the individual components is created without the use of additional adhesive.

In a preferred embodiment, a secondary sealing means, which fills the outer pane interspace in its entire width between the first pane and the second pane, is introduced in the outer pane interspace adjacent the primary sealing means. This secondary sealing means effects adhesive bonding of the first and the second pane and thus ensures sufficient mechanical stability of the insulating glazing unit. The secondary sealing means preferably contains a polymer or silane-modified polymer, particularly preferably organic polysulfides, silicones, room-temperature vulcanizing silicone rubber, high-temperature vulcanizing silicone rubber, peroxide vulcanizing silicone rubber, and/or addition vulcanizing silicone rubber, polyurethanes, and/or butyl rubber. Such materials have very good adhesion on glass such that the secondary sealing means serves primarily for adhesive bonding of the panes and contributes to the mechanical stability of the insulating glazing unit.

In a preferred embodiment of an insulating glazing unit with at least a third pane, this third pane protrudes only partly into the main member; in other words, the third pane does not divide the main member into two individual main members. Preferably, the pane protrudes into the main member for a distance of 20% to 80%, particularly preferably 30% to 60%, of the entire height of the main member and, consequently, does not come into contact with the primary sealing means. This arrangement improves the leakproofness compared to an arrangement in which the third pane extends beyond the entire height of the main member.

In another preferred embodiment of an insulating glazing unit with at least a third pane, this third pane protrudes the entire length of the main member into the main member. In an alternative embodiment, the third pane protrudes through the main member and through the primary sealing means, but not into the secondary sealing means.

In another alternative embodiment, the third pane protrudes through the main member, the primary sealing means, and the secondary sealing means.

In a preferred embodiment, the plastic profile includes, on the glazing interior surface, at least one opening, preferably a plurality of openings, that enable gas and moisture exchange between the main member and the inner pane interspace. Thus, the absorption of moisture by the desiccant that is included in the main member is permitted.

The main member preferably includes a sealing material from the group of hot-melt adhesives, preferably from that of the butyl-based hot-melt adhesives, preferably butyl rubber and/or polyisobutylene and a desiccant, which preferably contains silica gels, molecular sieves, $CaCl_2$, $Na_2SO_4$, activated carbon, silicates, bentonites, zeolites, and/or mixtures thereof. Other suitable combinations of sealing means and desiccants are known to the person skilled in the art from applications for thermoplastic spacers (TPS).

The plastic profile preferably contains polyethylene (PE), polycarbonates (PC), polypropylene (PP), polystyrene, polybutadiene, polynitriles, polyesters, polyurethanes, polymethyl methacrylate, polyacrylates, polyamides, polyethylene terephthalate (PET), polybutylene terephthalate (PBT), acrylonitrile butadiene styrene (ABS), acrylonitrile styrene acrylester (ASA), acrylonitrile butadiene styrene/polycarbonate (ABS/PC), styrene acrylonitrile (SAN), PET/PC, PBT/PC, and/or copolymers or mixtures thereof. The plastic profile can, optionally, also include other components, for example, glass fibers.

The primary sealing means preferably contains butyl rubber, polyisobutylene, polyolefin rubber, copolymers, and/or mixtures thereof.

The pane interspace of the insulating glazing unit is preferably filled with an inert gas, preferably with a noble gas, preferably argon or krypton, which reduce the heat transfer value in the pane interspace.

The first pane and/or the second pane contain glass and/or polymers, preferably quartz glass, borosilicate glass, soda lime glass, polymethyl methacrylate, and/or mixtures thereof. Other panes beyond the second pane also include these materials.

The panes have a thickness of 1 mm to 50 mm, preferably 3 mm to 16 mm, particularly preferably 3 mm to 10 mm, with the panes even possibly having different thicknesses. A variation of the thicknesses of the panes improves the soundproofing (asymmetric structure).

The invention further includes a method for producing an insulating glazing unit containing two panes. In a first step, a spacer is prepared by coextruding a main member containing a sealing material with desiccant and a primary sealing means on a plastic profile. This finished spacer is installed between two panes by mounting a first pane on a first pane contact surface and a second pane on a second pane contact surface. The spacer is arranged such that the plastic profile is arranged on the glazing interior surface, i.e., facing toward the inner pane interspace. In the last step, the pane arrangement produced from a first and second pane and a spacer is pressed, by which means a stable adhesive bond is produced.

Alternatively, the same insulating glazing unit containing two panes can be produced by coextruding the main member and primary sealing means directly onto the first pane, and, simultaneously, the plastic profile is arranged such that, in the assembled insulating glazing unit, it includes the glazing interior surface. The first pane contact surface of the spacer abuts the first pane after this step. In the next step, a second pane is mounted on a second pane contact surface, and the pane arrangement composed of the two panes and the spacer arranged therebetween, composed of the plastic profile, the main member, and the primary sealing means, is pressed, by which means a stable adhesive bond is produced.

In another advantageous embodiment of the method according to the invention for producing an insulating glazing unit containing two panes, the coextrusion onto a plastic profile is done directly into the intermediate space between a first pane and a second pane arranged parallel thereto. The main member and the primary sealing means are coextruded onto the plastic profile. The arrangement of the plastic profile and the coextrusion occur simultaneously.

The invention further includes a method for producing an insulating glazing unit according to the invention in accordance with claims 2 to 10 comprising:

Arranging a third pane between at least a first plastic profile and a second plastic profile, Coextruding a primary sealing means and a main member containing a sealing material with desiccant onto the plastic profile, which comprises the first plastic profile and the second plastic profile, and Pressing a pane arrangement composed of at least a first pane, a second pane, the third pane, the plastic profile, the main member, and the primary sealing means.

In a first advantageous embodiment of the method for producing an insulating glazing unit according to the invention in accordance with one of claims 2 to 10, a first plastic profile is first arranged between a first pane and a third pane, and a second plastic profile is arranged at the same height between the third pane and a second pane. This can be done, for example, by inserting a third pane between a first plastic profile and a second plastic profile, wherein the plastic profiles can be fixed at the same height on the third pane using an adhesive, for instance, acrylic adhesive tape. The first pane is then mounted adjacent the first plastic profile, and the second pane is mounted adjacent the second plastic profile. In the following step, a primary sealing means and a main member containing a desiccant are coextruded onto the two-part plastic profile containing the first and second plastic profile in the outer pane interspace. Here, the part of the third pane that protrudes into the outer pane interspace is preferably surrounded by the main member.

In a second advantageous embodiment of the method according to the invention for producing an insulating glazing unit according to one of claims 2 to 10, a main member containing a desiccant is first coextruded around a third pane together with a primary sealing means. At the same time, a first plastic profile is arranged on a first glazing interior surface, and a second plastic profile is arranged on a second glazing interior surface such that the plastic profile is directly adjacent the main member. For this, an extrusion die that is moved along the edge of the third pane can be combined with an application apparatus that applies the plastic profile simultaneously on the third pane. The plastic profile is semi-flexible and is made available as rolled goods. The application speed of the plastic profile is variable and can be adapted to the extrusion speed at corners or curves. Depending on the flexibility of the plastic profile used, the profile can be bent at the curves or corners of the pane. Alternatively, interruptions of the plastic profile can be introduced using a cutting apparatus. Since the main member composed of sealing material and the primary sealing means are mounted circumferentially, such interruptions of the plastic profile create no problems in the sealing of the pane arrangement. The third pane thus prepared can now be processed on a conventional double glazing system known to the person skilled in the art. Here, a pane arrangement composed of a first pane, a second pane, and the prepared third pane with spacers can be pressed. The costly installation of additional system components or a loss of time due to multiple passes through a system, as in the installation of multiple individual spacers according to the prior art, can thus be avoided. This is particularly advantageous in terms of increased productivity and cost reduction.

Preferably, the inner pane interspace of the pane arrangement is filled with a protective gas.

The invention further includes the use of an insulating glazing unit according to the invention as building interior glazing, building exterior glazing, and/or façade glazing.

In the following, the invention is explained in detail with reference to drawings. The drawings are purely schematic representations and not true to scale. They in no way restrict the invention.

Figure 1B:
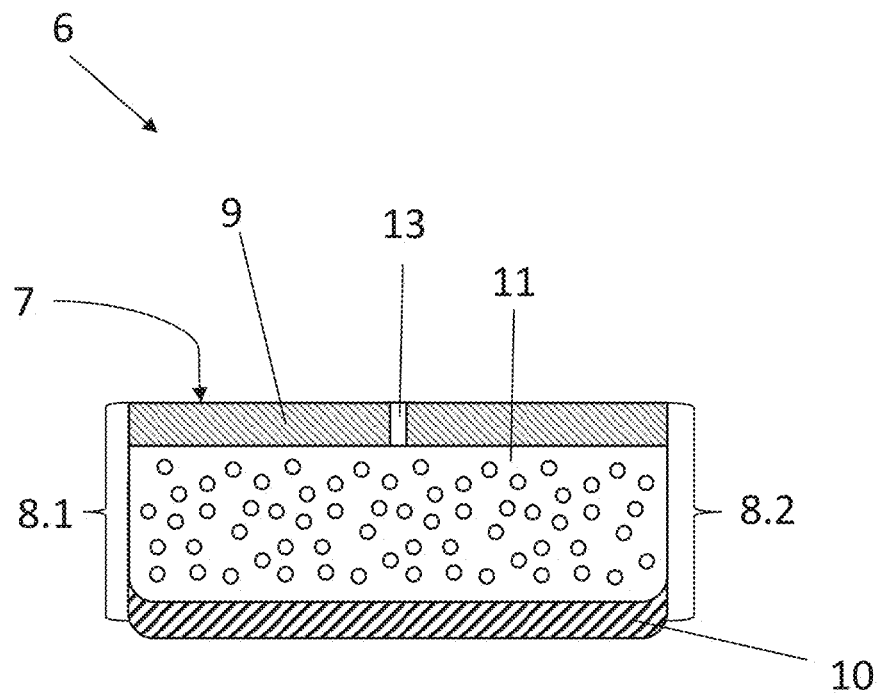
Figure 2:
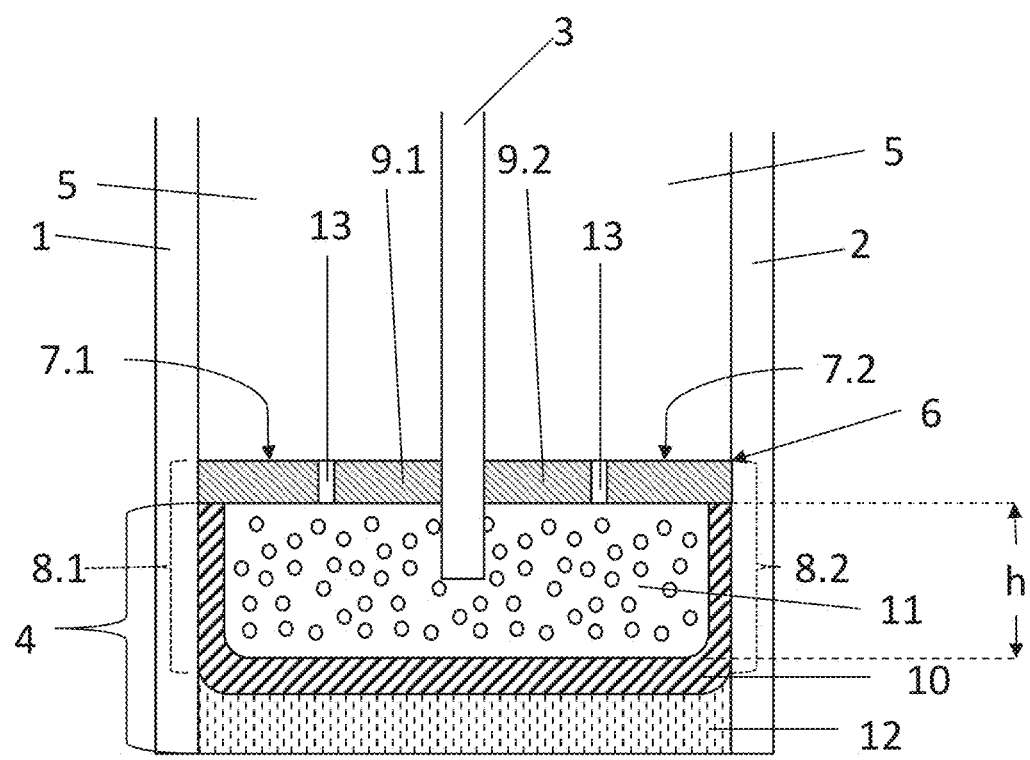
Figure 3:
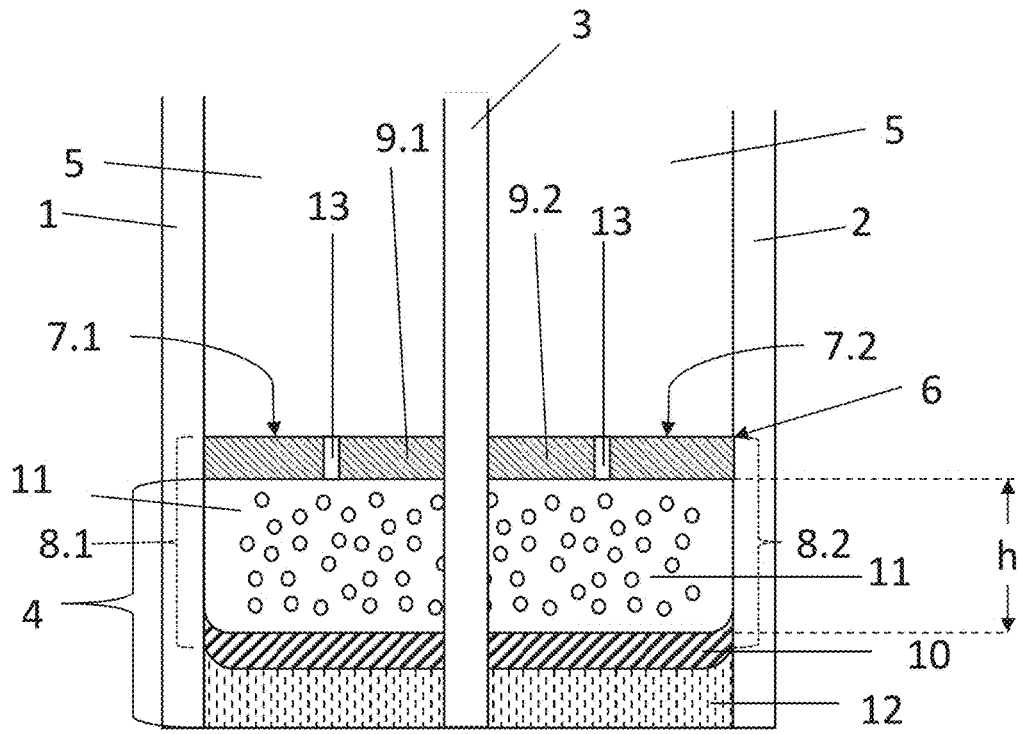
Figure 4:
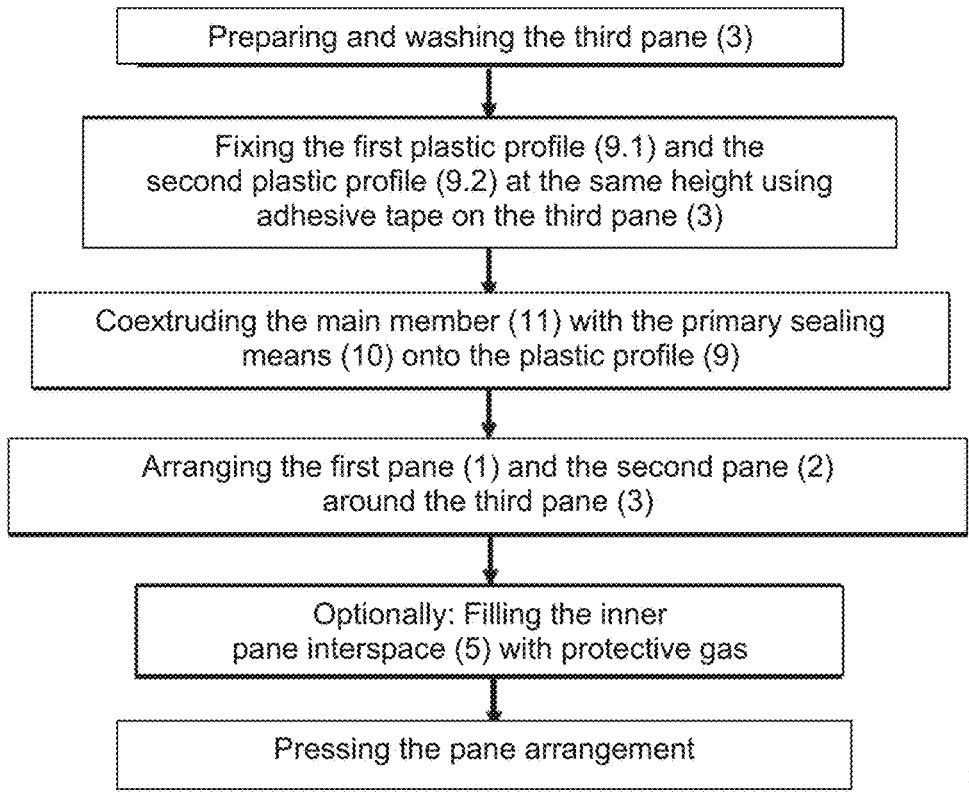
Figure 5:
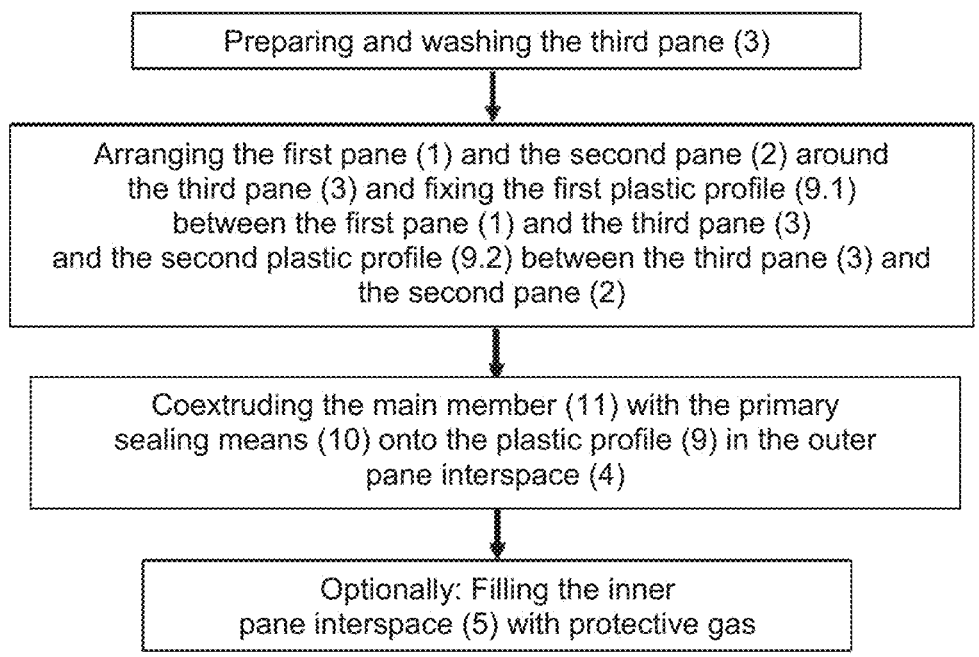

They depict:

FIGS. 1a and 1b: a schematic representation of the insulating glazing unit according to the invention, FIG. 2: a possible embodiment of the insulating glazing unit according to the invention, FIG. 3: a possible embodiment of the insulating glazing unit according to the invention, FIG. 4: a flowchart of a possible embodiment of a method according to the invention for producing an insulating glazing unit with three panes, FIG. 5: a flowchart of a possible embodiment of a method according to the invention for producing an insulating glazing unit with three panes.

FIGS. 1a and 1b depict a schematic representation of the edge region of an insulating glazing unit according to the invention in cross-section. Between a first pane 1 and a second pane 2 arranged parallel thereto, a circumferential spacer 6, which consists of a plastic profile 9, a main member 11, and a primary sealing means 10, is mounted. The main member 11 contains a sealing material with a desiccant, for instance, butyl with a molecular sieve. The desiccant is represented in the figure by circles. The inner pane interspace 5 adjacent the glazing interior surface 7 of the spacer 6 is defined as the space delimited by the panes 1, 2. The plastic profile 9 separates the inner pane interspace 5 from the outer pane interspace 4. The plastic profile 9 includes, on the glazing interior surface 7, openings 13, to produce a connection between the inner pane interspace 5 and the main member 11 to enable gas exchange and to allow absorption of moisture by the desiccant. In the outer pane interspace 4, a primary sealing means 10, which can be made of the same material as the main member 11, is applied adjacent the main member 11. Adjacent the primary sealing means 10, a secondary sealing means 12, for instance, an organic polysulfide, which serves for adhesive bonding of the two panes 1, 2 and increases the mechanical stability of the insulating glazing unit, is applied in the outer pane interspace 4. The first pane contact surface 8.1 and the second pane contact surface 8.2 are formed by the plastic profile 9, the main member 11, and the primary sealing means 10.

FIG. 2 depicts a possible embodiment of the insulating glazing unit according to the invention. The structure corresponds in its essential features to the example depicted in FIG. 1a, b. A third pane 3 is arranged between a first pane 1 and a second pane 2. The plastic profile 9 comprises a first plastic profile 9.1 on the first glazing interior surface 7.1 and a second plastic profile 9.2 on the second glazing interior surface 7.2, between which the third pane 3 is arranged. The third pane 3 protrudes into the main member 11 and, in this case, protrudes only by roughly 50% of the entire height h of the main member 11 into the main member 11. The dimensionally stable plastic profile 9 fixes the distances between the first pane 1 and the third pane 3 as well as between the third pane 3 and the second pane 2. The first plastic profile 9.1 and the second plastic profile 9.2 contain openings 13 on the glazing interior surfaces 7.1 and 7.2. The main member 11 contains butyl as a sealing means and a molecular sieve as a desiccant. The primary sealing means 10, which contains pure butyl, is arranged adjacent the main member 11, with the primary sealing means 10 forming a part of the first pane contact surface 8.1 and of the second pane contact surface 8.2 and thus surrounding the main member 11 on three sides. In this arrangement, the adhesive bonding of the panes 1 and 2 is improved, because pure butyl, compared to butyl containing desiccant, has better adhesive properties, which contributes to improved sealing of the system. In the outer pane interspace 4, polysulfide is arranged between the first pane 1 and the second pane 2 as the secondary sealing means 12 adjacent the primary sealing means 10. The secondary sealing means 12 ensures the adhesive bonding of the first pane 1 and the second pane 2 and contributes to the mechanical stability of the entire insulating glazing unit.

FIG. 3 depicts a possible embodiment of the insulating glazing unit according to the invention. The structure corresponds in its essential features to the example depicted in FIG. 2. The third pane 3 protrudes beyond the entire height h of the main member 11 into the main member 11. The main member 11 is thus divided into two parts and is adjacent the first plastic profile 9.1 in the outer pane interspace 4 between the first pane 1 and the third pane 3, and is adjacent the second plastic profile 9.2 between the third pane pane 3 and the second pane 2. In the outer pane interspace 4, a primary sealing means 10 and a secondary sealing means 12 are arranged adjacent the main member 11. The third pane 3 protrudes through the main member 11 and through the primary sealing means 10 and the secondary sealing means 12.

FIG. 4 depicts a flowchart of a method for producing an insulating glazing unit comprising three panes. After the preparation and washing of the third pane, two plastic profiles 9.1 and 9.2 are attached to the third pane 3 at the same height. The attachment can be done, for example, using a double-sided adhesive tape that is mounted on the sides of the plastic profiles 9.1 and 9.2. Next, the coextrusion of the main member 11 and the primary sealing means 10 onto the plastic profile 9 comprising 9.1 and 9.2 is done such that the third pane 3 protrudes into the main member 11, and the third pane 3 is provided with a circumferential spacer 6 composed of plastic profiles (9.1, 9.2), main member 11, and primary sealing means 10. This pre-assembled component can now be processed on a conventional double glazing system known to the person skilled in the art, wherein the two outer panes 1 and 2 are mounted on the pane contact surfaces 8.1 and 8.2 of the spacer 6. Optionally, the inner pane interspace 5 can be filled with protective gas. In the last step, the pane arrangement composed of the first pane 1, the second pane 2, the third pane 3, and the spacer 6 is pressed.

FIG. 5 depicts a flowchart of an alternative method for producing an insulating glazing unit comprising three panes. After the preparation of the third pane 3, it is arranged between the first pane 1 and the second pane 2. The first plastic profile 9.1 is fixed between the first pane 1 and the third pane 3, and the second plastic profile 9.2 is fixed between the third pane 3 and the second pane 2. Next, the main member 11 with the primary sealing means 10 is coextruded onto the plastic profile comprising the first plastic profile 9.1 and the second plastic profile 9.2 in the outer pane interspace 4.

LIST OF REFERENCE CHARACTERS 1 first pane
2 second pane
3 third pane
4 outer pane interspace 5 inner pane interspace
6 spacer
7 glazing interior surface
7.1 first glazing interior surface
7.2 second glazing interior surface
8.1 first pane contact surface
8.2 second pane contact surface
9 plastic profile
9.1 first plastic profile
9.2 second plastic profile
10 primary sealing means
11 main member
12 secondary sealing means
13 openings

The invention claimed is:

1. An insulating glazing unit comprising:
a first pane;
a second pane;
an outer pane interspace defined by a space between the first pane and the second pane bounded on one side by first edges of said panes;
an inner pane interspace defined by a space between the first pane and the second pane bounded on one side by second edges of said panes opposite the first edges; and
a spacer comprising:
a glazing interior surface;
a first pane contact surface;
a second pane contact surface;
a plastic profile;
a primary sealing means; and
a main member containing at least one sealing material containing a drying material,
wherein:
the plastic profile separates the outer pane interspace from the inner pane interspace,
the main member is arranged in the outer pane interspace adjacent and in direct contact with the plastic profile,
the primary sealing means is arranged in the outer pane interspace adjacent and in direct contact with the main member,
the first pane and the second pane each make direct contact with the plastic profile and the primary sealing means respectively at the first pane contact surface and the second pane contact surface, and
the primary sealing means encloses the main member on three sides.

2. The insulating glazing unit according to claim 1, further comprising a third pane arranged between the first pane and the second pane,
wherein:
the glazing interior surface comprises a first glazing interior surface and a second glazing interior surface,
the plastic profile comprises:
a first plastic profile on the first glazing interior surface between the first pane and the third pane; and
a second plastic profile on the second glazing interior surface between the third pane and the second pane,
the main member is arranged between the first pane and the second pane, and
the third pane protrudes into the main member in a region between the first plastic profile and the second plastic profile.

3. The insulating glazing unit according to claim 1, wherein the plastic profile comprises at least one opening to enable gas and moisture exchange between the main member and the inner pane interspace.

4. The insulating glazing unit according to claim 3, wherein the at least one opening comprises a plurality of openings.

5. The insulating glazing unit according to claim 1, wherein:
in the outer pane interspace between the first pane and the second pane, a secondary sealing means is arranged adjoining the primary sealing means, the secondary sealing means comprising a polymer or silane-modified polymer.

6. The insulating glazing unit according to claim 5, wherein the secondary sealing means comprises one or more of organic polysulfides, silicones, room-temperature vulcanizing silicone rubber, high-temperature vulcanizing silicone rubber, peroxide vulcanizing silicone rubber, and/or addition vulcanizing silicone rubber, polyurethanes, or butyl rubber.

7. The insulating glazing unit according to claim 2, wherein the third pane protrudes into the main member through a partial height of the main member relative to an entire height of the main member.

8. The insulating glazing unit according to claim 7, wherein the partial height is in a range of 20% to 80% of the entire height.

9. The insulating glazing unit according to claim 7, wherein the partial height is in a range of 30% to 60% of the entire height.

10. The insulating glazing unit according to claim 2, wherein the third pane protrudes beyond an entire height of the main member into the main member and/or the third pane protrudes through the primary sealing means.

11. The insulating glazing unit according to claim 10, wherein the third pane protrudes through the primary sealing means.

12. The insulating glazing unit according to claim 10, wherein the third pane protrudes through a secondary sealing means.

13. The insulating glazing unit according to claim 1, wherein the main member contains a sealing material and a desiccant.

14. The insulating glazing unit according to claim 13, wherein the sealing material comprises a hot-melt adhesive, polyisobutylene, and/or butyl rubber.

15. The insulating glazing unit according to claim 13, wherein the desiccant comprises silica gels, molecular sieves, $CaCl_2$, $Na_2SO_4$, activated carbon, silicates, bentonites, zeolites, and/or mixtures thereof.

16. The insulating glazing unit according to claim 1, wherein the plastic profile contains polyethylene (PE), polycarbonates (PC), polypropylene (PP), polystyrene, polybutadiene, polynitriles, polyesters, polyurethanes, polymethyl methacrylates, polyacrylates, polyamides, polyethylene terephthalate (PET), polybutylene terephthalate (PBT), acrylonitrile butadiene styrene (ABS), acrylonitrile styrene acrylester (ASA), acrylonitrile butadiene styrene/polycarbonate (ABS/PC), styrene acrylonitrile (SAN), PET/PC, PBT/PC, and/or copolymers or mixtures thereof.

17. The insulating glazing unit according to claim 1, wherein the primary sealing means contains butyl rubber, polyisobutylene, polyolefin rubber, copolymers, and/or mixtures thereof.

18. A method for producing an insulating glazing unit, the method comprising:
preparing a spacer by coextruding a main member containing a sealing material containing a desiccant and a primary sealing means on a plastic profile;
providing a first pane and a second pane;

bringing the first pane in direct contact with a first pane contact surface of the spacer, and bringing the second pane in direct contact with a second pane contact surface of the spacer, such that the plastic profile is arranged on a glazing interior surface of the spacer; and pressing together the first pane, the second pane, and the spacer, thereby producing a pane arrangement of the insulating glazing unit having a stable adhesive bond, wherein the insulating glazing unit comprises:
the first pane and the second pane;
an outer pane interspace defined by a space between the first pane and the second pane bounded on one side by first edges of said panes;
an inner pane interspace defined by a space between the first pane and the second pane bounded on one side by second edges of said panes opposite the first edges; and
the spacer comprising:
the glazing interior surface;
the first pane contact surface;
the second pane contact surface;
the plastic profile;
the primary sealing means; and
the main member containing the sealing material containing a drying material,
wherein:
the plastic profile separates the outer pane interspace from the inner pane interspace,
the main member is arranged in the outer pane interspace adjacent and in direct contact with the plastic profile,
the primary sealing means is arranged in the outer pane interspace adjacent and in direct contact with the main member,
the first pane and the second pane each make direct contact with the plastic profile and the primary sealing means respectively at the first pane contact surface and the second pane contact surface, and
the primary sealing means encloses the main member on three sides.

19. A method for producing an insulating glazing unit, the method comprising:
providing a first pane, a second pane, and a third pane;
arranging a first plastic profile between the first pane and the third pane and arranging a second plastic profile, at a same height as the first plastic profile, between the third pane and the second pane, the first plastic profile and the second plastic profile forming a plastic profile at an outer pane interspace of the insulating glazing unit, and
coextruding onto the plastic profile a primary sealing means and a main member containing a sealing material with desiccant,
wherein the insulating glazing unit comprises:
the first pane, the second pane, and the third pane;
an outer pane interspace defined by a space between the first pane and the second pane bounded on one side by first edges of said panes;
an inner pane interspace defined by a space between the first pane and the second pane bounded on one side by second edges of said panes opposite the first edges; and
a spacer comprising:
the glazing interior surface comprising a first glazing interior surface and a second glazing interior surface;
the first pane contact surface;
the second pane contact surface;
the plastic profile comprising a first plastic profile on the first glazing interior surface between the first pane and the third pane; and a second plastic profile on the second glazing interior surface between the third pane and the second pane;
the primary sealing means; and
the main member containing the sealing material containing a drying material,
wherein:
the plastic profile separates the outer pane interspace from the inner pane interspace,
the main member is arranged between the first and second panes in the outer pane interspace adjacent and in direct contact with the plastic profile,
the primary sealing means is arranged in the outer pane interspace adjacent and in direct contact with the main member,
the first pane and the second pane each make direct contact with the plastic profile and the primary sealing means respectively at the first pane contact surface and the second pane contact surface,
the third pane protrudes into the main member in a region between the first plastic profile and the second plastic profile, and
the primary sealing means encloses the main member on three sides.

20. A method for producing an insulating glazing unit, the method comprising:
providing a third pane;
coextruding a main member containing a desiccant together with a primary sealing means around the third pane, and, simultaneously mounting:
a first plastic profile on a first glazing interior surface, and
a second plastic profile on a second glazing interior surface directly adjacent the main member;
providing a first pane and a second pane;
bringing the first pane and the second pane respectively in direct contact with a first pane contact surface and a second pane contact surface of a spacer, the spacer comprising the first plastic profile, the second plastic profile, the main member, and the primary sealing means; and
pressing together the first pane, the second pane, the third pane, and the spacer, thereby producing a pane arrangement of the insulating glazing unit having a stable adhesive bond
wherein the insulating glazing unit comprises:
the first pane, the second pane, and the third pane;
an outer pane interspace defined by a space between the first pane and the second pane bounded on one side by first edges of said panes;
an inner pane interspace defined by a space between the first pane and the second pane bounded on one side by second edges of said panes opposite the first edges; and
the spacer comprising:
the glazing interior surface comprising a first glazing interior surface and a second glazing interior surface;
the first pane contact surface;
the second pane contact surface;
a plastic profile comprising the first plastic profile on the first glazing interior surface between the first pane and the third pane; and the second plastic profile on the second glazing interior surface between the third pane and the second pane;
the primary sealing means; and
the main member containing the sealing material containing a drying material, wherein:
the plastic profile separates the outer pane interspace from the inner pane interspace,
the main member is arranged between the first and second panes in the outer pane interspace adjacent and in direct contact with the plastic profile,
the primary sealing means is arranged in the outer pane interspace adjacent and in direct contact with the main member,
the first pane and the second pane each make direct contact with the plastic profile and the primary sealing means respectively at the first pane contact surface and the second pane contact surface,
the third pane protrudes into the main member in a region between the first plastic profile and the second plastic profile, and
the primary sealing means encloses the main member on three sides.

21. A method, comprising:
providing an insulating glazing unit according to claim 1; and
using of the insulating glazing unit as a building interior glazing, a building exterior glazing, and/or a façade glazing.

* * * * *